US008070580B2

(12) United States Patent
Blümel

(10) Patent No.: US 8,070,580 B2
(45) Date of Patent: Dec. 6, 2011

(54) CONVERSION OF LOWEST VALUE SYMBOLS INTO SPECIAL SYMBOLS IN A GAMING MACHINE

(75) Inventor: Günter Blümel, Seiersberg (AT)

(73) Assignee: Atronic International GmbH, Lübbecke (DE)

( * ) Notice: Subject to any disclaimer, the term of this patent is extended or adjusted under 35 U.S.C. 154(b) by 775 days.

(21) Appl. No.: 11/536,607

(22) Filed: Sep. 28, 2006

(65) Prior Publication Data

US 2008/0081687 A1 Apr. 3, 2008

(51) Int. Cl.
*A63F 13/00* (2006.01)

(52) U.S. Cl. ................................ 463/16; 463/20; 463/21

(58) Field of Classification Search .................... 463/16, 463/20, 25, 26, 30
See application file for complete search history.

(56) References Cited

U.S. PATENT DOCUMENTS

| | | | | |
|---|---|---|---|---|
| 7,147,559 | B2 * | 12/2006 | Englman | 463/25 |
| 2003/0064802 | A1 * | 4/2003 | Rodgers et al. | 463/30 |
| 2006/0030392 | A1 * | 2/2006 | Rodgers et al. | 463/16 |
| 2006/0068881 | A1 * | 3/2006 | Casey | 463/20 |
| 2006/0084494 | A1 * | 4/2006 | Belger et al. | 463/20 |
| 2006/0199634 | A1 * | 9/2006 | Anderson et al. | 463/20 |
| 2007/0021187 | A1 * | 1/2007 | Gauselmann | 463/20 |
| 2008/0026815 | A1 * | 1/2008 | Okada | 463/20 |
| 2008/0242404 | A1 * | 10/2008 | Aoki | 463/26 |

* cited by examiner

*Primary Examiner* — Dmitry Suhol
*Assistant Examiner* — Ankit Doshi
(74) *Attorney, Agent, or Firm* — Patent Law Group LLP; Brian D. Ogonowsky

(57) ABSTRACT

Upon a trigger event occurring during a main game on a video slot machine, a number of free games having a special feature are awarded to the player. For each trigger event that occurs during the free games, the lowest value symbol displayed for each free spin becomes a wild symbol or other high value symbol. The converted symbols remain converted during the entire free game session in one embodiment. In another embodiment, the converted symbols revert back to the original symbol if no further trigger event occurs in the free games. The accumulation of high value symbols over multiple spins increases the chances of the player winning an especially large award, such as a jackpot.

20 Claims, 5 Drawing Sheets

| | | | | |
|---|---|---|---|---|
| A | C | F | E | J |
| G | N | J | L | L |
| O | O | O | O | M |

Fig. 3A

Main game spin result.
Pay any awards.
Trigger event occurs to begin free game session.

| | | | | |
|---|---|---|---|---|
| A | B | C | D | E |
| G | G | G | I | J |
| K | L | A | N | O |

Fig. 3B

Free game "first" spin result.
Pay any award.
Trigger event occurs.
Initiate conversion feature.

| | | | | |
|---|---|---|---|---|
| ***W***(A) | B | C | D | E |
| G | G | G | I | J |
| K | L | ***W***(A) | N | O |

Fig. 3C

First spin result (continued).
Convert lowest value symbol ("A") to wild symbol for next spin.

Spin reels 1-5.

| | | | | |
|---|---|---|---|---|
| B | ***W***(A) | F | I | M |
| B | N | J | ***W***(A) | L |
| G | G | ***W***(A) | G | B |

Fig. 3D

Second spin result.
Pay any award using wild symbols from previous conversion.
Another trigger event occurs.

| | | | | |
|---|---|---|---|---|
| ***W***(B) | ***W***(A) | F | I | M |
| ***W***(B) | N | J | ***W***(A) | L |
| G | G | ***W***(A) | G | ***W***(B) |

Fig. 3E

Second spin result (continued).
Convert next lowest value symbol ("B") to wild symbol for next spin.

Spin reels 1-5

| | | | | |
|---|---|---|---|---|
| F | L | ***W***(B) | I | M |
| M | ***W***(A) | G | C | D |
| C | G | ***W***(A) | N | D |

Fig. 3F

Third spin result.
Pay any award using wild symbols from previous conversion.
No trigger event.
Keep wild symbols for next spin or reinstate all original symbols.

CONVERSION OF LOWEST VALUE SYMBOLS INTO SPECIAL SYMBOLS IN A GAMING MACHINE

FIELD OF THE INVENTION

This invention relates to gaming machines and, in particular, to a new type of special feature game, such as a bonus game, in a symbol combination type gaming machine.

BACKGROUND

Common slot machines randomly select and display an array of symbols on a video screen, then grant an award to a player based on the occurrence of certain symbol combinations across pay lines. Typically, the game ends after the symbols are displayed and the award, if any, is granted. Although these types of games are highly successful, it is advantageous to provide an additional feature to this basic game to make the game more interesting to a player. A more interesting game will generate increased revenue to the casino by its increased play.

What is needed is a special feature game that is initiated upon the occurrence of a trigger event to further add player excitement and keeps the player playing the gaming machine.

SUMMARY

Disclosed herein is a game played on a gaming device that displays a randomly selected array of symbols, such as a video slot machine or a video monitor connected to a computer for on-line gaming. In one embodiment, the array is 5×3 symbol positions (five virtual reels vertically displaying three symbols each). The combinations of symbols across one or more activated pay lines are evaluated by a processor to determine an award to be granted. The present invention adds a special feature game to this conventional operation of a gaming machine.

The special feature game is initiated upon a trigger event occurring during the main game. The trigger event may be the player achieving a special combination of symbols in the main game, or may be the occurance of a single special symbol, or may be a mystery event, or may occur at random. Other triggering events are also possible. In one embodiment, the player is granted X number of free games upon the occurrence of a certain combination of symbols, such as four diamond symbols, across a pay line as a triggering event. The player then plays the free games and is granted awards for various symbol combinations.

If another trigger event occurs during a free spin of the reels, the lowest value symbol on the screen are converted to high value wild symbols or another type of high value special symbol. If there are multiple ones of the lowest value symbol displayed, they are all converted. A wild symbol acts as a combination of all symbols for achieving combinations of symbols. An award is paid for any winning symbol combinations, using the converted symbols in conjunction with the regular symbols displayed.

On the next free spin, the reels are rotated and randomly stopped, and all the previously converted symbols remain as the wild symbols. The player is again granted an award based on any winning symbol combinations, including those made with the wild symbols. If the triggering event (e.g., a special combination of symbols) occurs again while the special feature is activated, then the currently displayed lowest value symbol displayed on the screen becomes a wild symbol, and the previously converted symbols remain converted. The player keeps spinning the reels during the free games, with the presently lowest value symbols becoming wild symbols upon a triggering event occurring during the free games, and awards are granted based on combinations of the displayed regular symbols and the wild symbols.

In another embodiment, the converted wild symbols are converted back to the original symbol after any game in which there is no trigger event.

The higher value symbol may be a scatter symbol, or any other symbol that has a higher potential award value.

The accumulation of high value symbols over multiple spins increases the chances of the player winning an especially large award, such as a jackpot.

Variations of the above scenario are also envisioned. In one embodiment, the special games are not required to be played during a free game session, and the special feature continues until an ending event occurs. In another embodiment, the conversion of symbols may occur during the main game if a trigger event occurs, and the conversion only lasts for one spin or until an ending event occurs. The trigger event for additional wild symbols during the free games may even be different from the trigger event that initiated the free game session. For example, the trigger event during the free games may be a single special symbol.

BRIEF DESCRIPTION OF THE DRAWINGS

FIGS. 3A-3F illustrate examples of symbols in a 5×3 array that are displayed on a video screen of the gaming machine after successive spins.

DETAILED DESCRIPTION

Although the invention can typically be implemented by installing a software program in most types of modern video gaming machines, one particular gaming machine platform will be described in detail.

Figure 1:
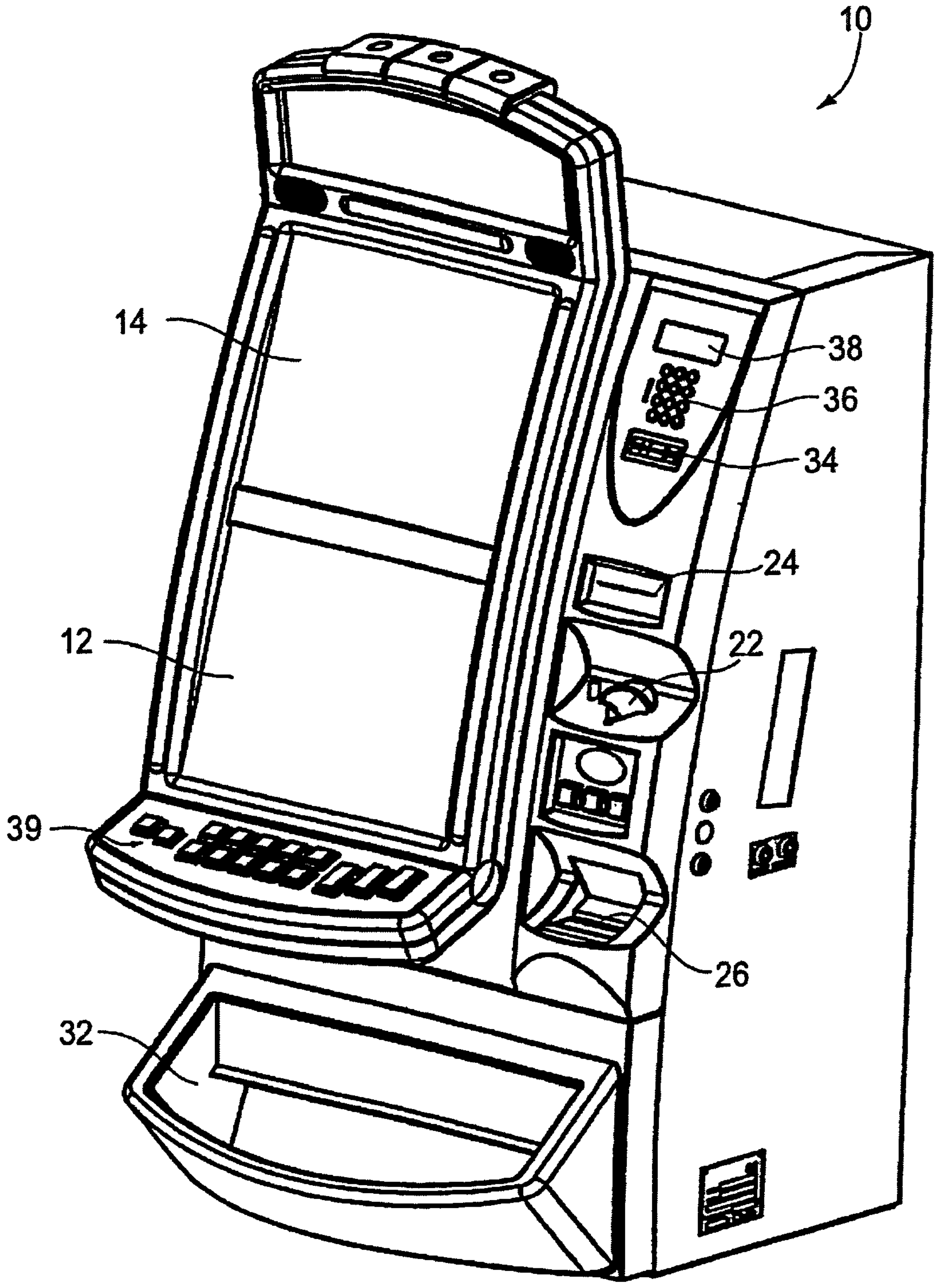
FIG. 1 is a perspective view of one type of gaming machine that is programmed to carry out the inventive game.

FIG. 1 is a perspective view of a gaming machine 10 that incorporates the present invention. Machine 10 includes a display 12 that may be a thin film transistor (TFT) display, a liquid crystal display (LCD), a cathode ray tube (CRT), or any other type of display. A second display 14 provides game data or other information in addition to display 12. Display 14 may provide static information, such as an advertisement for the game, the rules of the game, pay tables, pay lines, or other information, or may even display the main game or the bonus games along with display 12. Alternatively, the area for display 14 may be a display glass for conveying information about the game.

Display 12 or 14 may have a touch screen lamination that includes a transparent grid of conductors. Touching the screen changes the capacitance between the conductors, and thereby the X-Y location of the touch may be determined. The processor associates this X-Y location with a function to be performed. Such touch screens are very well known in the field of slot machines, and a detailed description of them is not required.

A coin slot 22 accepts coins or tokens in one or more denominations to generate credits within machine 10 for playing games. An input slot 24 for an optical reader and printer receives machine readable printed tickets and outputs printed tickets for use in cashless gaming. A bill acceptor 26 accepts various denominations of banknotes.

A coin tray 32 receives coins or tokens from a hopper upon a win or upon the player cashing out.

A card reader slot 34 accepts any of various types of cards, such as smart cards, magnetic strip cards, or other types of cards conveying machine readable information. The card reader reads the inserted card for player and credit information for cashless gaming. The card reader may also include an optical reader and printer for reading and printing coded barcodes and other information on a paper ticket.

A keypad 36 accepts player input, such as a personal identification number (PIN) or any other player information. A display 38 above keypad 36 displays a menu for instructions and other information and provides visual feedback of the keys pressed.

Player control buttons 39 include any buttons needed for the play of the particular game or games offered by machine 10 including, for example, a bet button, a repeat bet button, a spin reels button, a maximum bet button, a cash-out button, a display pay lines button, a display payout tables button, select icon buttons, and any other suitable button. Buttons 39 may be replaced by a touch screen with virtual buttons.

Figure 2:
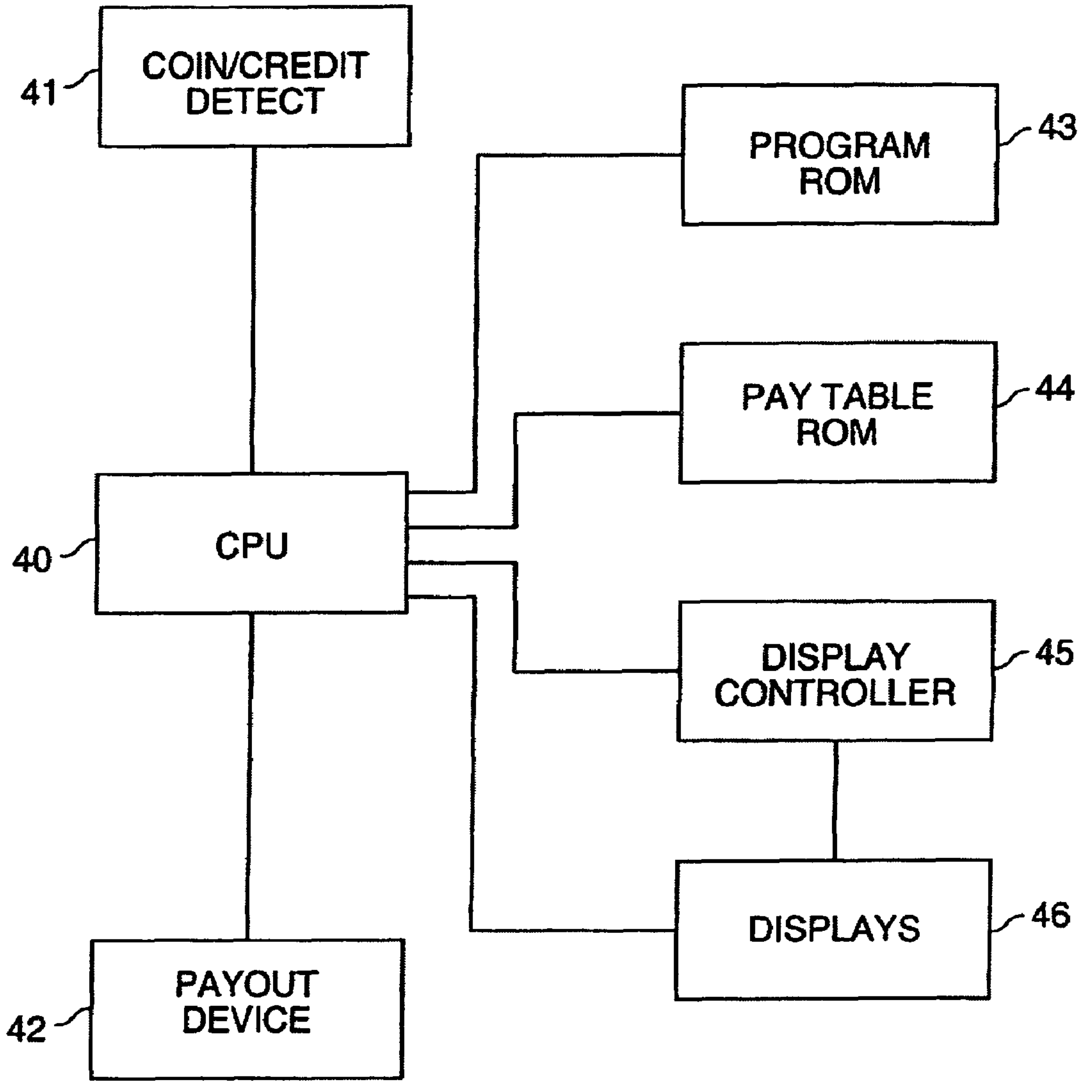
FIG. 2 is a functional block diagram showing the basic functional units in the gaming machine of FIG. 1.

FIG. 2 illustrates basic circuit blocks in a suitable gaming device. A control unit (CPU 40) runs a gaming program stored in a program ROM 43. A coin/credit detector 41 enables the CPU 40 to initiate a next game. A pay table ROM 44 detects the outcome of the game and identifies awards to be paid to the player. A payout device 42 pays out an award to the player in the form of coins upon termination of the game or upon the player cashing out. A payout may also be in the form of a coded paper ticket, credits on a smart card or magnetic strip card, or in any other form. A display controller 45 receives commands from the CPU 40 and generates signals for the various displays 46. If a display 46 is a touch screen, player commands may be input through the display screen into the CPU 40.

The game described below includes a special feature game that is initiated upon a special outcome of the main game displayed on machine 10 in FIG. 1. The main game may be the video simulation of motor-driven reels, where combinations of symbols across one or more pay lines are associated with awards to be granted to the player. Some symbol combinations pay credits as an award, and one or more other symbol combinations also trigger the special feature game. Such triggering events activating the special feature game may also be based on a random event or on any other criteria. Initiating a special feature game in a gaming machine is well known, and the software used to initialize the special feature game may be conventional.

FIGS. 3A-3F are simple examples of images displayed on display 14 or display 12 in FIG. 1, where five virtual reels, rotating vertically, pseudo-randomly stop their rotation to display symbols in a 5×3 array. It is assumed the symbols range from A-O.

Figure 4:
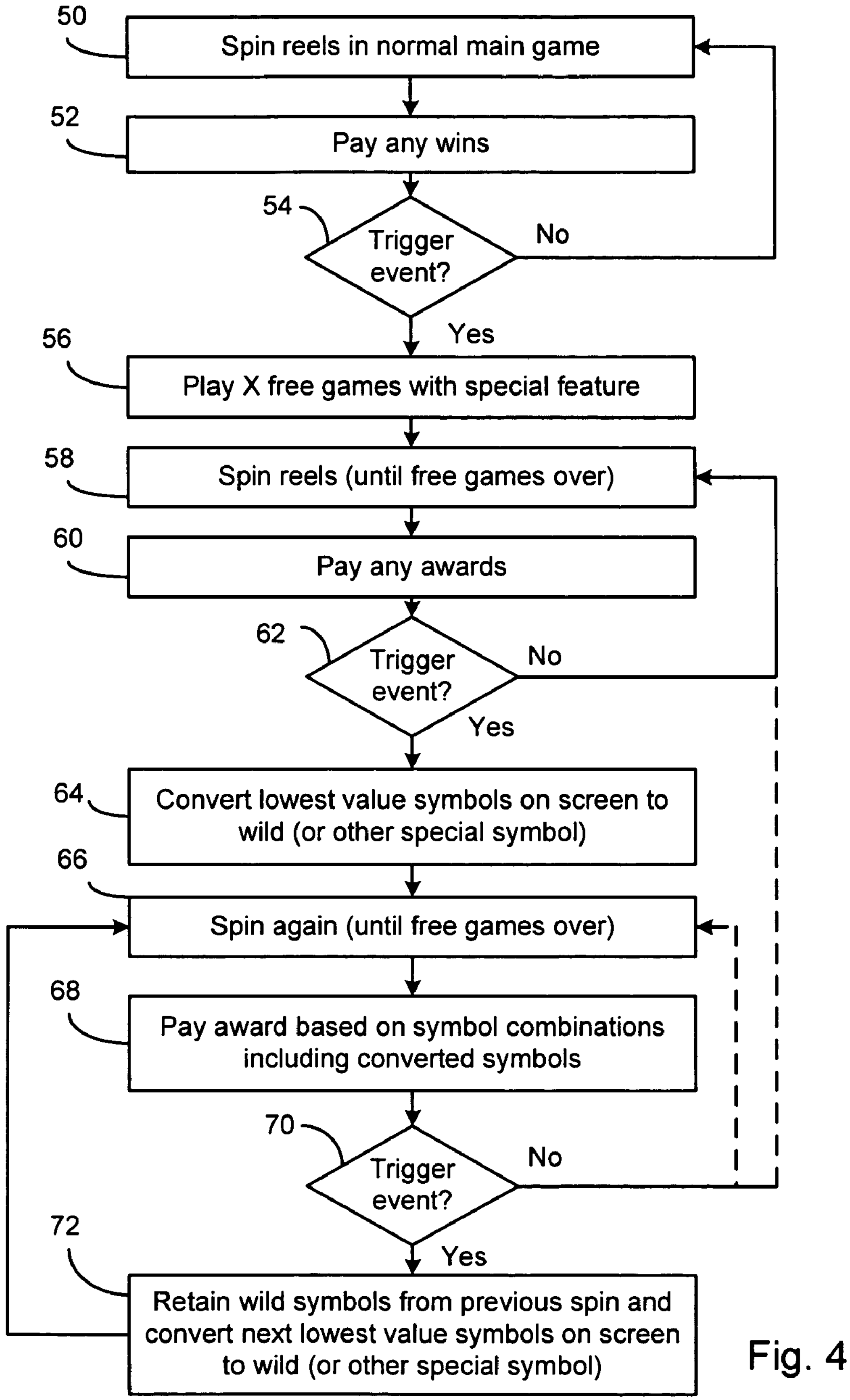
FIG. 4 is a flow chart of the basic method carried out during games having the special feature.

FIG. 4 is a flow chart identifying certain steps carried out by the gaming machine, and its steps will be referenced while discussing FIGS. 3A-3F.

In step 50 of FIG. 4, it is assumed the player has been playing the main game, which is a conventional symbol combination game. After each spin, the player is granted an award for any winning combinations (step 52). In step 54, it is determined whether a triggering event has occurred, which, in the example, is four of the same symbol along a pay line. This occurrence is shown in the screen display of FIG. 3A, where ten free games having the special feature have been triggered by the main game achieving a combination of four "O" symbols across the bottom pay line. The four "O" symbols are outlined with a rectangle for ease of understanding. Any trigger event may be used, such as a single symbol, a mystery event, or a random event.

The player then starts playing her free games (steps 56, 58), and is granted awards for winning symbol combinations (step 60). If the player achieves a trigger event during the free games, a special conversion feature is initiated (step 62). FIG. 3B illustrates the screen after a free spin in which a trigger event (three G symbols) has occurred. The trigger event is assumed to be three of the same symbols across a pay line or higher. Upon a trigger event occurring, the lowest value symbol displayed is converted to a higher value symbol (step 64).

The lowest value symbols displayed on the screen of FIG. 3B are the "A" symbols. The relative value of a symbol is typically determined by looking at the pay table of the gaming machine, which is usually a static display that shows the awards granted for each different combination of symbols. The amount of the award for a symbol combination (e.g., three A's) is generally based on the likelihood of those symbols being displayed. The more likely a symbol is to be displayed, the lower the value of the symbol since the award for combinations of that symbol will be the lowest. In some cases, combinations of the lowest value symbols (e.g., a lemon) grant no award to the players. In some software techniques, the odds of any symbol on a reel being displayed is directly based on the number of times the symbol occurs around a virtual reel, and the stopped reel positions are all equally likely to occur. In other systems a pseudo-random number generator is programmed with the various probabilities of each symbol or symbol combination being granted, and the outcome of the pseudo-random number generator is used to control the display subsystem to display the predetermined symbol array. In either case, the symbol with the highest likelihood of occurring in a symbol combination is generally the lowest value symbol since it is associated with the lowest award.

Since the lowest value symbol in the display of FIG. 3B is presumed to be the "A" symbol, all "A" symbols around the reels are converted to a higher value symbol (step 56), as shown in FIG. 3C. The higher value symbol in the example is a wild symbol "W" overlaid on top of the "A" symbol so the player realizes the benefits obtained during the special feature games. This conversion may be shown to the player with some fanfare after the first spin.

In another embodiment, the symbols that are the lowest value symbols are converted even if the lowest value symbols are not currently displayed.

The player then spins the reels again (step 66). The conversion of all the "A" symbols on the reels to wild symbols applies to the next spin outcome, illustrated in FIG. 3D. The player then wins any award based on the regular symbols in combination with the converted wild symbols (step 68).

In another embodiment, the occurrence of the trigger event during the main game initiates the free spins, and the conversion of the lowest value symbols to the special symbols occurs upon the free games being initiated.

In the example of FIG. 3D, the player has obtained three G symbols in the lower horizontal pay line along with a wild symbol (a former "A" symbol), so the player effectively has obtained four G symbols, and has again achieved a trigger event (step 70). Since the trigger event has again been achieved, the presently lowest value displayed symbols, which are presumed to be the "B" symbols, become wild symbols, and the "A" symbols remain wild for a subsequent spin (step 72). FIG. 3E illustrates the "B" symbols being converted to wild symbols before (or concurrently with) the next spin. Had there been no “B” symbols, the “F” symbol would have been the lowest value symbol displayed and would have been converted to a wild symbol.

FIG. 3F illustrates the result of the next spin, where the wild symbols have replaced all the “A” and “B” symbols. The player is granted any award for winning symbol combinations. Since no trigger event occurred in FIG. 3F, no further symbols are converted to wild symbols.

In one embodiment, the converted symbols stay wild for all the free games. In another embodiment, the converted symbols stay wild for only a single spin unless another trigger event occurs, in which case the previously converted symbols stay wild and the next lowest values symbols displayed are converted to wild symbols. In such an embodiment, since no trigger event occurred in FIG. 3F, all the symbols are converted back to their original state for the next free spin.

At the end of the free spins, the gaming machine reverts back to normal play, where symbols are not converted to other symbols unless a trigger event occurs. In one embodiment, the free games end upon the player not achieving a trigger event or after a certain number of free games.

In one embodiment, the trigger event that occurs during the free games to convert the lowest value symbol to a higher value symbol is different from the trigger event that must occur during the regular games to initiate the free games. In one embodiment, if the player receives a special trigger event during the free game session, additional free games and/or additional special features are initiated.

The special feature may apply to games that are not free games. In such a case, the player pays for each subsequent spin, and the special feature ends after some ending event, such as the player not achieving certain combinations of symbols or after a certain number of games.

During the games with the special feature, the lowest value symbol displayed may become any special symbol in addition to a wild symbol, such as the highest value symbol, or a scatter symbol, or the highest value symbol acting as a scatter symbol, or any other symbol. A scatter symbol is a symbol that applies for a combination whether or not it occurs on the same pay line as other symbols used in the combination.

A large jackpot award may be granted for a special symbol combination. The accumulation of the wild symbols during the free games greatly increases the chances of the player achieving the jackpot symbol combination. High jackpot awards entice players to play the machines.

The game may be played with other sizes of symbol arrays such as 1×3, 3×3, etc.

The various games described are easily implemented by a software programmer programming the game and suitable graphics into a memory, such as program ROM 43 in FIG. 2. The CPU 40 carries out the game, as will be understood by those skilled in the art.

The game may be played on a stand-alone machine, or on a machine connected to a server, or on-line via the Internet, or on any device having a display and a processor, such as a cell telephone. All such devices may be considered gaming machines or gaming devices.

While particular embodiments of the present invention have been shown and described, it will be obvious to those skilled in the art that changes and modifications may be made without departing from this invention in its broader aspects and, therefore, the appended claims are to encompass within their scope all such changes and modifications as fall within the true spirit and scope of this invention.

What is claimed is:

1. A method performed by a gaming device comprising:

displaying, during a game, an initial array of symbols at symbol positions on a display screen that have been selected pseudo-randomly, certain combinations of symbols along one or more pay lines providing an award for a player;

detecting that a trigger event has occurred for initiating a plurality of special games having a special feature, the special games comprising the method of:

a. pseudo-randomly selecting and displaying a first array of symbols at the symbol positions, the first array of symbols including one or more lowest value symbols that have a lowest value in the first array;

b. detecting that a trigger event has occurred during the first array;

c. upon detecting that a trigger event has occurred in step b, converting all the lowest value symbols in the first array of symbols to a higher value symbol, but not converting other symbols in the first array to the higher value symbol, a value of a symbol being related to an award that may be won using the symbol, the higher value symbol being combinable to create one or more winning symbol combinations that are different from a winning symbol combination using the lowest value symbol;

d. pseudo-randomly selecting and displaying a second array of symbols at the symbol positions to pseudo-randomly replace all the symbols in the first array, wherein a pool of symbols for possible selection includes the converted higher value symbol from step c so as to increase a possibility that the higher value symbol will be selected;

e. granting any award to a player based upon winning combinations of symbols in the second array of symbols, including combinations using symbols that were converted to the higher value symbol in step c;

f. detecting whether a trigger event has occurred during the second array of symbols;

g. in response to detecting that a trigger event has occurred in step f, converting all lowest value symbols in the second array of symbols to the higher value symbol but not converting other symbols in the second array to the higher value symbol;

h. pseudo-randomly selecting and displaying symbols for a next array of symbols at the symbol positions to pseudo-randomly replace all the symbols in the second array, wherein the pool of symbols for possible selection includes previously converted higher value symbols;

i. granting any award to a player based upon winning combinations of symbols in the next array of symbols, including combinations using symbols that were converted to the higher value symbol; and j. repeating steps d through i for each selected array of symbols until all special games have been played.

2. The method of claim 1 wherein the initial array of symbols is the first array when a trigger event has occurred for initiating the plurality of special games.

3. The method of claim 1 wherein the first array of symbols is generated after the initial array of symbols is generated.

4. The method of claim 1 wherein the special games are free games.

5. The method of claim 1 wherein the lowest value symbol is the displayed symbol in an array of symbols that has the highest probability of being pseudo-randomly selected.

6. The method of claim 1 wherein the trigger event is a certain combination of symbols in an array of symbols.

7. The method of claim 1 wherein step c of converting a lowest value symbol in the first array of symbols to a higher value symbol comprises visually changing a look of the lowest value symbol to the look of the higher value symbol.

8. The method of claim 7 wherein visually changing the look of the lowest value symbol occurs prior to pseudo-randomly selecting a new array of symbols in which the visually changed symbols are used for determining an award.

9. The method of claim 1 wherein the higher value symbol is a wild symbol.

10. The method of claim 1 wherein the higher value symbol is a scatter symbol, and is a different type of symbol than the lowest value symbol.

11. The method of claim 1 wherein there is a 5×3 array of symbol positions.

12. The method of claim 1 wherein, if no trigger event is detected in step f, converted symbols are changed back to original symbols.

13. The method of claim 1 wherein, even if no trigger event is detected in step f, converted symbols remain converted for any subsequent arrays of symbols during the special games.

14. The method of claim 1 wherein the trigger event in step b is different from the trigger event that initiated the special games.

15. A method performed by a gaming device comprising:

a. displaying, during a game, an array of symbols at symbol positions on a display screen that have been selected pseudo-randomly, certain combinations of symbols along one or more pay lines providing an award for a player, the array of symbols including one or more first value symbols;

b. detecting that a trigger event has occurred;

c. upon a trigger event being detected, converting all the first value symbols in the array to a higher value symbol of a different type, but not converting other symbols in the array to the higher value symbol, a value of a symbol being related to an award that may be won using the symbol, the higher value symbol being combinable to create one or more winning symbol combinations that are different from a winning symbol combination using the first value symbol;

d. pseudo-randomly selecting and displaying a first array of symbols at the symbol positions to pseudo-randomly replace all the symbols in the array of step a, wherein a pool of symbols for possible selection includes the converted higher value symbol from step c so as to increase a possibility that the higher value symbol will be selected;

e. granting any award to a player based upon winning combinations of symbols in the first array of symbols, including combinations using symbols that were converted to the higher value symbol;

f. pseudo-randomly selecting and displaying symbols for a next array of symbols to pseudo-randomly replace all the symbols in the first array, wherein a pool of symbols for possible selection includes the converted higher value symbol from step c;

g. upon a trigger event being detected, converting a second value symbol in the next array of symbols to the higher value symbol, but not converting other symbols in the next array to the higher value symbol, the higher value symbol being combinable to create one or more winning symbol combinations that are different from a winning symbol combination using the second value symbol; and h. granting any award to a player based upon winning combinations of symbols in the next array of symbols, including combinations using symbols that were converted to the higher value symbol.

16. The method of claim 15 wherein the first value symbol is the lowest value symbol displayed in the first array.

17. The method of claim 15 wherein the trigger event is a certain combination of symbols.

18. The method of claim 15 wherein the trigger event is an occurrence of a special triggering symbol.

19. The method of claim 15 wherein the higher value symbol is a wild symbol.

20. An electronically controlled video gaming machine comprising:

a display screen;

a programmed processor for carrying out the method comprising:

a. displaying, during a game, an initial array of symbols at symbol positions on a display screen that have been selected pseudo-randomly, certain combinations of symbols along one or more pay lines providing an award for a player;

b. detecting that a trigger event has occurred for initiating a plurality of special games having a special feature, the special games comprising the method of:

c. pseudo-randomly selecting and displaying a first array of symbols at the symbol positions, the first array of symbols including one or more lowest value symbols that have a lowest value in the first array;

d. detecting that a trigger event has occurred during the first array;

e. upon detecting that a trigger event has occurred in step d, converting all the lowest value symbols in the first array of symbols to a higher value symbol, but not converting other symbols in the first array to the higher value symbol, a value of a symbol being related to an award that may be won using the symbol, the higher value symbol being combinable to create one or more winning symbol combinations that are different from a winning symbol combination using the lowest value symbol;

f. pseudo-randomly selecting and displaying a second array of symbols at the symbol positions to pseudo-randomly replace all the symbols in the first array, wherein a pool of symbols for possible selection includes the converted higher value symbol from step e so as to increase a possibility that the higher value symbol will be selected;

g. granting any award to a player based upon winning combinations of symbols in the second array of symbols, including combinations using symbols that were converted to the higher value symbol in step e;

h. detecting whether a trigger event has occurred during the second array of symbols;

i. in response to detecting that a trigger event has occurred in step h, converting all lowest value symbols in the second array of symbols to the higher value symbol;

j. pseudo-randomly selecting and displaying symbols for a next array of symbols at the symbol positions to pseudo-randomly replace all the symbols in the second array, wherein the pool of symbols for possible selection includes previously converted higher value symbols; and k. granting any award to a player based upon winning combinations of symbols in the next array of symbols, including combinations using symbols that were converted to the higher value symbol.

* * * * *